(12) United States Patent
Scharkowski

(10) Patent No.: US 11,424,586 B2
(45) Date of Patent: Aug. 23, 2022

(54) METHOD FOR ULTRASONIC WELDING AT LEAST ONE WELDING SLEEVE TO A CONNECTION PART

(71) Applicant: Auto-Kabel Management GmbH, Hausen i.W. (DE)

(72) Inventor: Oliver Scharkowski, Cottbus (DE)

(73) Assignee: Auto-Kabel Management GmbH, Hausen (DE)

( * ) Notice: Subject to any disclaimer, the term of this patent is extended or adjusted under 35 U.S.C. 154(b) by 0 days.

(21) Appl. No.: 17/420,326

(22) PCT Filed: Jan. 21, 2020

(86) PCT No.: PCT/EP2020/051351
§ 371 (c)(1),
(2) Date: Jul. 1, 2021

(87) PCT Pub. No.: WO2020/169292
PCT Pub. Date: Aug. 27, 2020

(65) Prior Publication Data
US 2022/0094127 A1    Mar. 24, 2022

(30) Foreign Application Priority Data

Feb. 20, 2019    (DE) ..................... 10 2019 104 261.5

(51) Int. Cl.
*B23K 20/00*    (2006.01)
*H01R 43/02*    (2006.01)
*B23K 20/10*    (2006.01)

(52) U.S. Cl.
CPC ....... *H01R 43/0207* (2013.01); *B23K 20/106* (2013.01); *H01R 2201/26* (2013.01)

(58) Field of Classification Search
CPC .. H01R 43/0207; H01R 4/029; B23K 20/106; B23K 2101/04; B23K 20/129; B23K 2101/38
See application file for complete search history.

(56) References Cited

U.S. PATENT DOCUMENTS

| | | |
|---|---|---|
| 2011/0048763 A1 | 3/2011 | Schloms et al. |
| 2016/0006138 A1 | 1/2016 | Harms et al. |
| 2020/0266595 A1* | 8/2020 | Goetzmann .......... B23K 20/129 |

FOREIGN PATENT DOCUMENTS

| | | |
|---|---|---|
| CN | 107405722 A | 11/2017 |
| DE | 10 2009 009 399 A1 | 8/2010 |

(Continued)

OTHER PUBLICATIONS

International Searching Authority/EP, International Search Report and Written Opinion of the International Searching Authority, Application No. PCT/EP2020/051351, dated Jun. 26, 2020 (*with English translation of the International Search Report*), 24 pages.

(Continued)

*Primary Examiner* — Erin B Saad
(74) *Attorney, Agent, or Firm* — Sunstein LLP

(57) ABSTRACT

The subject matter relates to a process for welding at least one welding sleeve to an electrical connection part. The subject matter also relates to a system comprising a welding sleeve and an electrical connection part as well as an ultrasonic welding device with an ultrasonic welding tool, in particular with a sonotrode.

11 Claims, 2 Drawing Sheets

(56) References Cited

FOREIGN PATENT DOCUMENTS

DE      10 2013 101 876 B3    6/2014
DE      10 2016 105 768 B3    3/2017
EP              2 227 347 B1    9/2010
WO     WO 2017/167463 A1    10/2017

OTHER PUBLICATIONS

German Patent Office, First Office Action, Application No. 10 2019 104 261.5, dated Oct. 28, 2019, 4 pages (*in German*).
China National Intellectual Property Administration, Notification of the First Office Action, Application No.202080015717.7, dated Feb. 16, 2022, 8 pages.

\* cited by examiner

METHOD FOR ULTRASONIC WELDING AT LEAST ONE WELDING SLEEVE TO A CONNECTION PART

CROSS-REFERENCE TO RELATED APPLICATIONS

This application is the national phase entry of international patent application no. PCT/EP2020/051351 filed Jan. 21, 2020 and claims the benefit of German patent application No. 10 2019 104 261.5, filed Feb. 20, 2019, the disclosures of which are incorporated herein by reference in their entirety.

TECHNICAL FIELD

The subject matter relates to a method for welding at least one welding sleeve to a connection part, a system comprising at least one welding sleeve and a connecting part, and an ultrasonic welding device. The above-mentioned connection between welding sleeve and connecting part will be used in particular in automotive applications, preferably when connecting welding sleeves with connecting parts such as bus bars or flat conductors.

BACKGROUND ART

In the automotive industry more and more flat conductors are being used instead of round conductors recently, as these are superior to conventional round conductors with regard to their current-carrying capacity and for constructional reasons. However, round conductors, which are connected to the flat conductor by means of material bonding, remain to be used for contacting electrical consumers. With regard to module and cell connectors of battery cells, however, a connection of flat conductors to each other is also necessary. When using flat conductors as the main strand or as a bus bar for the battery cable or as module or cell connectors, the aim is to establish contact between the flat conductor and the consumer. Such a contact can be made, for example, via connecting bolts and connection lugs. A connecting bolt is usually located directly on the consumer or the components to be connected.

It has been shown, however, that the attachment of connecting bolts to flat conductors is problematic in many cases. Such connections must be electrically stable and protected against environmental influences. When using aluminum or soft copper material as conductor material of the flat conductor, it must also be ensured that the flat conductor does not deform when the connecting bolt is connected. Especially when screwing the connecting bolt to the flat conductor, it can happen that the screw presses into the flat conductor material, because at the required tightening torque the screw head or a flange on the bolt causes a too high surface pressure compared to the relatively high viscosity of the flat conductor material. As a result, either the required tightening torque cannot be maintained or the material of the flat conductor tends to flow when tightened. In addition, it is possible that the screw connections may loosen under mechanical stress, since the material of the flat conductor may deform under the screw connections. Furthermore, it is usually required and desired that the contact surfaces of the joining partners have a coating. This coating, which is usually formed of nickel and/or tin, provides corrosion protection and ensures a long-lasting electrical connection.

Furthermore, it is known that welding sleeves, in particular rotationally symmetric welding sleeves, can be joined to the flat conductor by friction welding. For this purpose, however, the welding sleeves have to be designed in such a way that the welding sleeves can be positively engaged by a friction tool so that the welding sleeves can be reliably welded to the connecting part by means of friction welding. Among other things, this restricts the production method and also leads to increased costs. A further disadvantage of the aforementioned process is the long process times.

It is also known to connect a welding sleeve to the flat conductor by means of torsional ultrasonic welding. The ultrasonic welding tool contacts a surface of a flange of the welding sleeve opposite to the connecting part for the introduction of energy and thus leaves an impression in the form of the sonotrode contour on the flange of the welding sleeve. This is a major disadvantage, especially with regard to the subsequent contacting of the connecting part or the welding sleeve, since no intact flat contact can be made. Furthermore, the coating of the welding sleeve is damaged on the flange side, which counteracts corrosion protection and a long-lasting electrical connection.

Therefore, the subject matter was based on the object to provide a possibility for joining a connecting part and a welding sleeve, which is process-safe and has only a short process time.

SUMMARY OF THE INVENTION

An ultrasonic welding seam is preferably formed between a part of the outer surface of the welding sleeve and a part of the inner surface of the recess of the connecting part and/or between at least parts of a flange surface of the welding sleeve and at least parts of the surface of the connecting part facing the flange. In particular, the welding process used is torsional ultrasonic welding.

The recess of the connecting part is in particular a substantially circular hole, further preferably a substantially circular through hole. It is preferred that the connecting part is designed as a bus bar or conductor. If the connecting part is designed as a conductor, it is further preferred to design the conductor as a flat conductor, having two narrow sides and two long sides. For a flat conductor it is preferred that the at least one recess is placed in one of the two long sides.

The above-mentioned method is advantageous in achieving short process times when welding at least one welding sleeve and one connecting part.

According to one embodiment, the welding sleeve has an opening which is designed as a through-hole extending along the longitudinal axis of the welding sleeve.

The inner surface of the welding sleeve has a frontal, circumferential edge in the area of the opening of the welding sleeve. The inner edge of the opening can be chamfered so that the diameter of the opening of the welding sleeve tapers in the longitudinal direction of the welding sleeve, in particular conically or arcuately. Starting from an end face of the welding sleeve, the opening thus tapers in the longitudinal direction of the welding sleeve. The taper can be frustoconical or arcuate. The taper preferably has a angle of inclination between 10° and 80°, preferably between 25° and 55°. The taper of the opening serves as a contact surface between the welding sleeve and a welding tool, so that the welding tool can introduce sufficient energy for the material bond.

By contacting the inner surface of the welding sleeve with the ultrasonic welding tool, it can be avoided that a later contact surface of the welding sleeve shows an impression of the ultrasonic welding tool. Such an impression is disadvantageous with regard to contacting. It is preferable that the ultrasonic welding tool contacts the welding sleeve only on the inner surface of the welding sleeve and therefore leaves a contour imprint only on the inner surface of the welding sleeve. According to a preferred embodiment, the welding sleeve is in particular tubular in shape.

According to one embodiment, the welding sleeve is formed from at least two sections, a first section having a first outside diameter and a second section having a second outside diameter larger than the first outside diameter, and wherein the welding sleeve is inserted into the recess until the second section of the welding sleeve at least partially abuts the connecting part. It is preferred that the inside diameter of the recess located in the connecting part is substantially congruent to the outside diameter of the first section of the welding sleeve. The second section is preferably formed as a collar-shaped flange, which enables a good fastening of the welding sleeve to the connecting part. The inner diameters of the two sections of the welding sleeve are preferably substantially identical. One side of the flange faces the connector in the inserted position. It is also possible that the outer diameter of the first section is unchanged along the longitudinal axis of the welding sleeve, whereas the outer diameter of the second section tapers towards a front end of the welding sleeve. It is also possible that the outer diameter is geometrically different from the inner diameter to increase the contact area of the welding sleeve.

According to a further embodiment, the welding sleeve is set into high-frequency oscillation around the longitudinal axis of the welding sleeve by means of the ultrasonic welding tool. The high-frequency oscillation preferably has a frequency in a range of 15 to 40 kHz, especially a frequency in a range of 20 to 35 kHz. This allows the welding sleeve to be reliably welded to the connecting part in a short process time.

Furthermore, it is preferred that the welding sleeve is inserted into the recess and set into vibration in particular simultaneously. This is particularly advantageous in order to break up an oxide layer on the connecting part and/or on the welding sleeve and thus to achieve an advantageous material connection.

According to an embodiment, it is suggested that the welding tool has an end section which can be inserted into the opening in the welding sleeve. Thus, the end region can engage in the opening in a mandrel-like, especially truncated cone shape. A mandrel-like, in particular truncated cone shaped design of the end region of the ultrasonic welding tool makes it possible to weld welding sleeves of different diameters, in particular different inner diameters, to the connecting part with the same ultrasonic welding tool.

According to another embodiment, it is proposed that the ultrasonic welding tool has an end region to accommodate at least part of the welding sleeve and that the end region is designed in the shape of a mandrel, in particular in the shape of a truncated cone. The geometry of the mandrel shape should advantageously be geometrically similar, in particular congruent to the geometry of the opening in the welding sleeve in the area of the taper. The spiked end region may taper towards the front side. A taper angle can be between 10° and 80°, preferably between 25° and 55°.

It is suggested that the process time to perform the procedure is less than 2.0 seconds, especially 1.5 seconds. A short process time is particularly advantageous for the economy and productivity of the welding process in question. A welding cycle, i.e. the welding of a welding sleeve to the connecting part, is to be considered as process time.

Another aspect is a system comprising at least one welding sleeve and one electrical connection part.

As the ultrasonic welding tool preferably contacts only the inner surface of the welding sleeve, the ultrasonic welding tool leaves a contour imprint only on the inner surface of the welding sleeve. Accordingly, the flange of the welding sleeve can have a height of less than 2.0 mm, in particular a height of less than 1.5 mm, especially preferably a height of less than 1.0 mm, since only small forces have to be absorbed by the flange. As a result, the welding sleeve protrudes only slightly over the connecting part, which is advantageous with regard to a reduction of the installation space.

It is preferred that both the first section and the second section are hollow tube-shaped, so that both the first section and the second section of the welding sleeve have a through-hole with an inner jacket surface.

Furthermore, it is preferred that the connecting part is a bus bar or a conductor, especially a flat conductor. In particular it is a motor vehicle bus bar or a motor vehicle flat conductor.

After a design, the welding sleeve is connected to the connecting part by means of an ultrasonic weld, in particular by means of a torsional ultrasonic weld. In particular, at least a part of the outer shell surface of the first section is welded to at least a part of the inner surface of the recess by means of ultrasonic welding, in particular by means of torsional ultrasonic welding.

Also, a part of the flange with its flange surface facing the connecting part may be welded to the connecting part by means of ultrasonic welding, in particular by means of torsional ultrasonic welding.

According to another embodiment, it is suggested that the through-hole extends into the first section and that the inner diameter of the through-hole is in particular constant along the longitudinal axis of the welding sleeve. In this way, even if the height of the second section is low, the welding sleeve can be reliably placed on the ultrasonic welding tool and welded to the connecting part by means of an ultrasonic weld.

With regard to a later electrical contacting of the flange of the welding sleeve, it is also advantageous if the contour impression of the ultrasonic welding tool is only arranged on the inner surface of the welding sleeve. Thus, the flange surface does not show any contour imprint of the ultrasonic welding tool. In this respect it is further preferred that the ultrasonic welding tool touches the welding sleeve only at its inner surface.

Another aspect is an ultrasonic welding device, especially an ultrasonic welding device for carrying out a previously described procedure. The advantages described with regard to the procedure apply equally to the ultrasonic welding device in question.

The end region is preferably the area of the ultrasonic welding tool that is designed to come into contact with a workpiece to be joined, in particular with a welding sleeve.

The mandrel-like, in particular truncated cone shape of the end region makes it possible in a structurally advantageous manner to join different workpieces to be joined, in particular different welding sleeves to be joined, with the same ultrasonic welding tool. By means of a mandrel-like, especially truncated cone-shaped contouring of the end region of the ultrasonic welding tool, both the welded part can be safely picked up and set into high-frequency oscillation around the longitudinal axis of the welded part.

It is preferred that the end region is designed to accommodate workpieces to be joined, in particular welding sleeves with different internal diameters, and to weld them with a connecting part. In this way, different welding sleeves can be efficiently joined with the same ultrasonic welding tool.

BRIEF DESCRIPTION OF THE DRAWINGS

In the following, the subject matter will be explained in more detail by means of drawings showing embodiments. The drawings show in.

DETAILED DESCRIPTION OF SPECIFIC EMBODIMENTS

Figure 1:
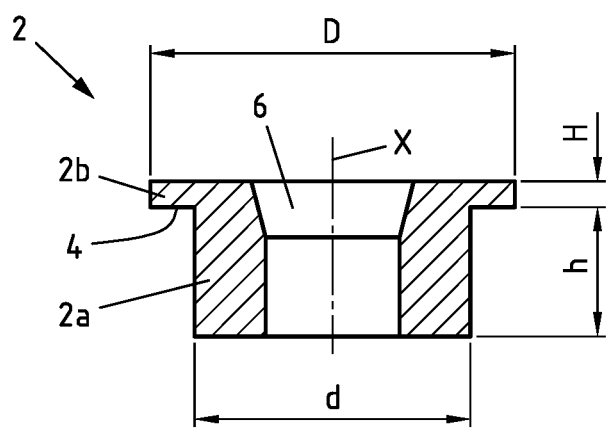
FIG. 1 a cross-section of a welding sleeve.

FIG. 1 shows a welding sleeve 2. The welding sleeve 2 is formed by two sections 2a and 2b. The sections 2a and 2b are arranged next to each other in the direction of the longitudinal axis X of the welding sleeve 2.

The two sections 2a, b can be formed in one piece from the solid material of the welding sleeve 2.

It can be seen that section 2a has a smaller diameter d than section 2b, which has a diameter D. Due to the larger diameter D, section 2b is arranged flange-like on section 2a, thus forming a support surface 4 pointing in the direction of section 2a.

The section 2a preferably has a height h which corresponds to the material thickness of the connecting part to be connected to the welding sleeve 2. Section 2b formed as a flange has a height H which is preferably less than 2.5 mm, in particular less than 1.5 mm and particularly preferably less than 1.0 mm.

The welding sleeve 2 has a tubular design and has a through-hole 6 with an inner jacket surface. The through-hole 6 passes through the first section 2a and the second section 2b.

It can be seen that the diameter of the through-hole 6 decreases from the front end in section 2b in the longitudinal direction of the welding sleeve 2 along the axis X. This taper of the through-hole can be truncated cone, as shown, or arc-shaped. In particular, the taper has a gradient angle between 25° and 55°.

Figure 2:
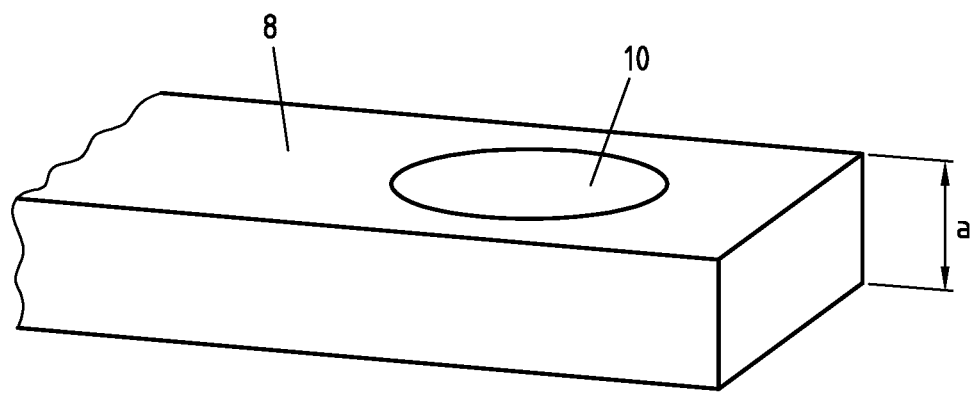
FIG. 2 a connection part with a recess.

FIG. 2 shows a connection part 8 with a recess 10, which is provided in the form of a circular passage opening. The connecting part 8 is designed as a bus bar. The recess 10 has a profile which is preferably substantially congruent to the outside diameter of the first section 2a. The thickness of the connection part 8 preferably corresponds to the height h of the first section 2a. The connecting part 8 is preferably made of an aluminium material, whereas the welding sleeve 2 is preferably made of a copper material, steel or similar.

Figure 3:
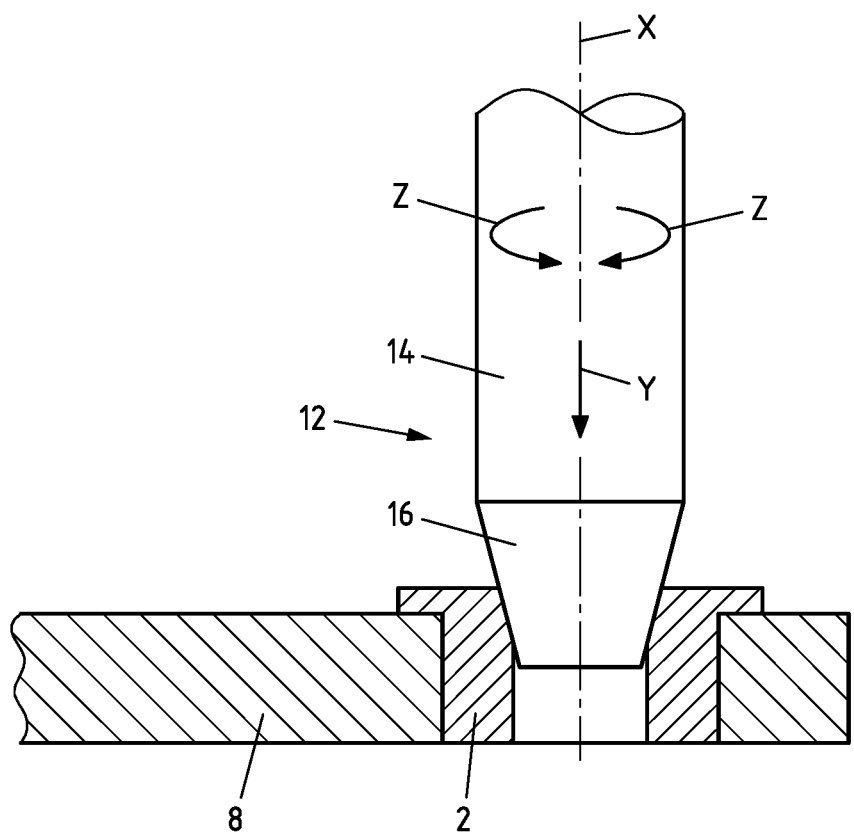
FIG. 3 a configuration of an ultrasonic welding tool with welding sleeve and connecting part during the welding process.

FIG. 3 shows a design of an ultrasonic welding tool 12 with welding sleeve 2 and connecting part 8 during the welding process. The ultrasonic welding tool is preferably designed as a sonotrode 12, whereby the sonotrode 12 has a circular cylindrical base body 14 and an end region 16, whereby the end region 16 tapers in the direction of its front end, in particular substantially frustoconical or arcuate. The taper angle is preferably between 25° and 55°. The outer diameter of the end section 16 is preferably geometrically similar or congruent to the tapered inner diameter of the opening 6 in section 2b. The outer lateral surface of end section 16 is preferably geometrically similar or congruent to the inner lateral surface of opening 6 in the area of the taper. Due to the truncated cone shaped end section 16, welding sleeve 2 with different through openings 6 can be mounted on the same horn 12.

The welding sleeve 2 is first attached to the horn 12. Due to the tapered end region 16, the horn 12 only comes into contact with the inner surface of the recess 10, so that the outer surfaces of the welding sleeve 2 have in particular no contour imprint of the horn 12 after the welding process.

After the welding sleeve 2 has been placed on the sonotrode 12, it is preferable that the welding sleeve 2 is inserted into the recess 10 in the direction of the arrow Y in particular at the same time and is set into a high-frequency oscillation around the longitudinal axis X of the welding sleeve 2 in the direction of the arrows Z. The welding sleeve 2 is inserted into the recess 10 until the contact surface 4 rests against the connecting part 8.

After creating an ultrasonic welding seam between the welding sleeve 2 and the connecting part 8, the sonotrode 12 is removed and the procedure for welding the welding sleeve 2 to the connecting part 8 is completed. Preferably, such a procedure has a process time of less than 2.0 seconds, in particular less than 1.5 seconds.

What is claimed is:

1. Method for welding a welding sleeve to an electrical connection part, comprising:
    sliding the welding sleeve onto an ultrasonic welding tool, wherein the welding sleeve has a through-hole with an inner jacket surface;
    inserting the welding sleeve into a recess in the connection part; and
    welding at least a part of the welding sleeve to the connection part using the ultrasonic welding tool, characterized in that,
    the inner surface of the welding sleeve is in contact with the ultrasonic welding tool.

2. Method according to claim 1, wherein the through-hole tapers conically or arcuately, starting from an end face of the welding sleeve in the longitudinal direction of the welding sleeve.

3. Method according to claim 1 wherein at least part of the welding sleeve is received by an end region of the ultrasonic welding tool, and the end region is a mandrel with a truncated cone shape.

4. Method according to claim 1, wherein the welding sleeve is formed from at least two sections,
    a first section has a first outside diameter and a second section has a second outside diameter larger than the first outside diameter, and
    the welding sleeve is inserted into the recess until the second section of the welding sleeve is at least partially in contact with the connection part.

5. Method according to claim 1, wherein the welding sleeve is set into an oscillation at a frequency between 15 to 40 kHz around the longitudinal axis of the welding sleeve by means of the ultrasonic welding tool.

6. Method according to claim 5 wherein the welding sleeve is simultaneously inserted into the recess and set into vibration.

7. Method according to claim 1 wherein the process time for carrying out the method is less than 2.0 seconds.

8. Method according to claim 5, wherein
    at least part of the welding sleeve is received by an end region of the ultrasonic welding tool, and
    the end region is a mandrel with a truncated cone shape.

9. Method according to claim 2, wherein the through-hole tapers conically starting from an end face of the welding sleeve in the longitudinal direction of the welding sleeve with an angle of inclination between 10° and 80°.

10. Method according to claim 2, wherein the through-hole tapers conically starting from an end face of the welding sleeve in the longitudinal direction of the welding sleeve with an angle of inclination between 25° and 55°.

11. Method according to claim 1 wherein the process time for carrying out the method is less than 1.5 seconds.

* * * * *